(12) United States Patent
Sasaki et al.

(10) Patent No.: US 8,254,543 B2
(45) Date of Patent: Aug. 28, 2012

(54) SENSOR EVENT CONTROLLER

(75) Inventors: Kazuo Sasaki, Kawasaki (JP); Tatsuro Matsumoto, Kawasaki (JP); Ai Yano, Kawasaki (JP); Eiichi Takahashi, Kawasaki (JP); Masayuki Fukui, Kawasaki (JP); Yutaka Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1672 days.

(21) Appl. No.: 11/606,110

(22) Filed: Nov. 30, 2006

(65) Prior Publication Data
US 2007/0266310 A1    Nov. 15, 2007

(30) Foreign Application Priority Data
Apr. 26, 2006   (JP) .................................. 2006-122315

(51) Int. Cl.
*H04M 3/42* (2006.01)
*H04M 3/00* (2006.01)
(52) U.S. Cl. .................................. 379/201.01; 455/420
(58) Field of Classification Search .......... 455/419–420; 379/201.01
See application file for complete search history.

(56) References Cited

U.S. PATENT DOCUMENTS
2001/0025306 A1    9/2001   Ninokata et al.

FOREIGN PATENT DOCUMENTS
JP          2001-265680 A      9/2001

*Primary Examiner* — Rasha Al Aubaidi
(74) *Attorney, Agent, or Firm* — Westerman, Hattori, Daniels & Adrian, LLP

(57) ABSTRACT

A sensor event controller dynamically switches a destination to which sensor event data are to be notified, according to a service application program (AP) that a user is using, and notifies sensor event data in compliance with an interface of the service AP as the notification destination. An information collection part stores information for identification of a service AP used on a browser and header information transmitted/received between the browser and the service AP in a collected data storage part. Upon receiving sensor event data, a data-notified application determination part decides that the service AP used on the browser is a service AP as the notification destination, by referring to the collected data storage part. A notified data conversion part converts the sensor event data so that the data are compliant with an input interface of the service AP as the notification destination, and transmits a processing request to the service AP as the notification destination, the processing request being generated by adding the header information to the converted sensor event data.

8 Claims, 17 Drawing Sheets

| Field Name | Value |
|---|---|
| Name of application currently in use | Manual display application |
| Header for manual display application | Cookie:JSESSIONID=1234<br>User-Agent:Mozilla/4.0 |

FIG. 4

| Field Name | Value |
|---|---|
| Name of application currently in use | Work report application |
| Header for manual display application | Cookie:JSESSIONID=1234<br>User-Agent:Mozilla/4.0 |
| Header for work report application | Cookie:JSESSIONID=3567<br>User-Agent:Mozilla/4.0 |

FIG. 5

```
<event timestamp="20060322" type="rfid">
   <data>
      <tagid>1248902</tagid>
   </data>
</event>
```

FIG. 6

```
<service-define>
 <service name="manual display application">
  <target url="http://test.com/mannual/select" command="GET" />
  <transfer xsl="mannualservice.xsl" />
 </service>
 <service name="work report application">
  <target url="http://test.com/report/create" command="POST" />
  <add-headers>
   <header name="Content-Type" value="application/x-www-form-urlencoded" />
  </add-headers>
  <transfer xsl="report.xsl" />
 </service>
</service-define>
```

FIG.7

```
<?xml version="1.0" encoding="Shift_JIS" ?>
<xsl:stylesheet version="1.0" xmlns:xsl="http://www.w3.org/1999/XSL/Transform"
  exclude-result-prefixes="#default">
<xsl:output method="text" encoding="Shift_JIS" omit-xml-declaration="yes"/>
<xsl:template match=""/>
  name=<xsl:value-of select="tagid" />
</xsl:template>
</xsl:stylesheet>
```

FIG.8

```
<?xml version="1.0" encoding="Shift_JIS" ?>
<xsl:stylesheet version="1.0" xmlns:xsl="http://www.w3.org/1999/XSL/Transform" exclude-result-prefixes="#default">
<xsl:output method="text" encoding="Shift_JIS" omit-xml-declaration="yes" />
<xsl:template match="/">
id=<xsl:value-of select="tagid" />
</xsl:template>
</xsl:stylesheet>
```

FIG.9

```
GET /manual/select?name=1248902 HTTP/1.0
User-Agent: Mozilla/4.0
Cookie:JSESSIONID=1234
```

FIG. 10

```
POST /report/create HTTP/1.0
User-Agent: Mozilla/4.0
Content-Length: 10
Content-Type: application/x-www-form-urlencoded
Cookie:JSESSIONID=3567 id=1248902
```

FIG. 11

```
<event timestamp="20060322" type="rfid" readerid="Reader3425">
    <data>
        <tagid>1248902</tagid>
    </data>
</event>
```

FIG. 15

```
GET /setrelation HTTP/1.0
User-Agent: Mozilla/4.0
Content-Length: 19
Content-Type: application/x-www-form-urlencoded
Cookie:WEBID=Web001 readerid=Reader3425
```

FIG. 19

| Browser ID | Reader ID |
|---|---|
| Web001 | Reader3425 |
| Web002 | Reader3222 |

FIG. 20

| Field Name | Value |
|---|---|
| Browser ID | Web001 |
| Name of application currently in use | Work report application |
| Header for manual display application | Cookie:JSESSIONID=1234 User-Agent:Mozilla/4.0 |

FIG. 21

SENSOR EVENT CONTROLLER

BACKGROUND OF THE INVENTION

1. Field of the Invention

The present invention relates to a sensor data processing technology that is applied so that various service application programs that are used by using various user interfaces such as Web browsers and Voice XML browsers are allowed to process, in place of input from a user interface, sensor data read out by a machine as input from the user interface, and the result of the foregoing processing operation is displayed by the user interface.

2. Description of Related Art

The increasingly widespread use of the Internet and the progresses of the Web technologies have allowed users to acquire and use various types of information on the Internet from WWW (World Wide Web) servers by using Web browsers. Contents acquired from the WWW servers are described with a description language called "HTML (Hyper Text Markup Language)", and the Web browsers interpret such information and display the same on screens.

Such Web systems have made evolutional development as Web application programs that not only simply acquire static contents on servers and display the same on screens, but also carry out information processing such as converting input data acquired from Web browsers into databases, etc., on the servers side, and based on the result of the foregoing information processing, dynamically produce contents and output the same to browsers. This development allows users to easily use various services on the Internet such as on-line shopping via the Web browsers.

On the other hand, companies have applied these Web technologies to business operations, thereby providing themselves with easy access to business systems via Web browsers, and various business systems have been constructed by using the Web technologies. The business systems, however, inevitably have problems of increases in operators' burdens, input errors, etc., due to manual input operations, since the data input to business systems via Web browsers is carried out by humans. To cope with these problems, systems for automation of data entry have been introduced, which are achieved by using reading machines to reading data such as barcodes and having output results displayed on Web browsers. Recently, with the progression of the RFID (Radio Frequency Identification) technology, systems using RFID tags in place of barcodes become used widely, with which the contents of tags are read out and notified to business systems.

Such a system is configured to use a scheme as follows: with a URL that tells a destination of data notification being embedded in a RFID tag (or a barcode), the URL is read out by a reading program in a reading device and a Web browser is instructed to display the read URL, whereby data notification to a service application program side is carried out. However, this scheme has the following drawback: since the URL telling the notification destination is embedded fixedly in the RFID tag, when the URL of the service application program is changed later, a necessity of rewriting all the contents of the RFID tag arises. Therefore, the following scheme is applied to an actual system: only business data such as an ID of an invoice are entered in a RFID tag (or a barcode), while information relating to a notification destination is registered on the reading program side, and the reading program side produces an actual URL according to the read data and the registered information on the notification destination, to instruct the Web browser to display the site at the URL.

It should be noted that, though not including a disclosure relating to a sensor device such as RFID, JP 2001-265680 A discloses the following configuration. A session identifier using media of a plurality of kinds such as E-mail, Web, and voice media is issued, and when a data transmission-reception part receives a processing request including a session identifier from a user through an optional medium, a medium interface converts the session identifier uniformly to usable data and delivers them to an integration management part. Then, the integration management part manages the session on the basis of the converted session identifier.

Here, the foregoing conventional system in which a RFID reading program generates a URL, however, has had the following problem: since information regarding the notification destination is embedded in the reading program, a service application program as a notification destination is fixed unchangeably. Therefore, in order that the service application program as a destination to which data in a RFID tag are notified is changed according to contents of a user's business, the destination information registered in the reading program side has to be re-registered every time.

Another problem is that as information read out is embedded in a URL and notified to a service application program, the service application program side has to know in advance the embedding method of the reading program so as to retrieve the embedded information. Therefore, a service application program to acquire data in a RFID tag has to revise its interface in compliance with the embedding method applied to the RFID tag.

SUMMARY OF THE INVENTION

To solve the above-described problems, it is an object of the present invention to provide a sensor event controller that dynamically switches a destination to which sensor event data are to be notified, according to a service application program that a user is using, and notifies sensor event data in compliance with an interface of the service application program as the notification destination.

To achieve the above-described object, the sensor event controller according to the present invention is a sensor event controller for notifying sensor event data obtained from a sensor device to a service application program designed for accepting a processing request containing an input from a browser and returning a result of a requested processing operation to the browser. The sensor event controller includes: an information collection part that collects information for identification of a service application program that is being used on a browser, and header information transmitted/received between the browser and the service application program, and stores the same as collected data in a collected data storage part; a data reception part that receives sensor event data obtained from the sensor device; a data-notified application determination part that, referring to the collected data in the collected data storage part, decides that the service application program that is being used on the browser is a service application program as a destination to which the sensor event data are to be notified; a data conversion part that converts the sensor event data received by the data reception part under conversion rules preliminarily defined with respect to the service application program as the notification destination, so that the data are compliant with an input interface of the service application program as the notification destination; an application invocation part that transmits a processing request to the service application program as the notification destination, the processing request being generated by adding the header information contained in the collected data in the collected data storage part to the converted sensor event data; and a contents transmission part that transmits a result of a requested processing operation received from the service application program to the browser.

Further, a program product according to the present invention is a program product that stores a sensor event control program in a recording medium, which is designed to cause a computer to execute a processing operation of notifying sensor event data obtained from a sensor device to a service application program designed for accepting a processing request containing an input from a browser and returning a result of a requested processing operation to the browser. The program includes instructions for allowing a computer to execute the following operations of: collecting information for identification of a service application program that is being used on the browser, and header information transmitted/received between the browser and the service application program, and stores the same as collected data in a collected data storage part; receiving the sensor event data obtained from the sensor device; referring to the collected data in the collected data storage part, and deciding that the service application program that is being used on the browser is a service application program as a destination to which the sensor event data are to be notified; converting the sensor event data under conversion rules preliminarily defined with respect to the service application program as the notification destination, so that the data are compliant with an input interface of the service application program as the notification destination; transmitting a processing request to the service application program as the notification destination, the processing request being generated by adding the header information contained in the collected data in the collected data storage part to the converted sensor event data; and transmitting a result of a requested processing operation received from the service application program to the browser.

The present invention makes it possible to use data of RFID tags on various service application programs, and also makes it possible to use data of RFID tags on service application programs that are designed on the precondition of manual entry via conventional Web browsers, without revising interfaces for these service application programs.

BRIEF DESCRIPTION OF THE DRAWINGS

FIG. 4 illustrates exemplary collected data that are collected when the Web browser is carrying out the display shown in FIG. 2 on the display of the user terminal.

FIG. 5 illustrates exemplary collected data that are collected when the Web browser is carrying out the display shown in FIG. 3 on the display of the user terminal.

FIG. 6 is an explanatory view illustrating exemplary sensor event data generated by a RFID reading part.

FIG. 7 is an explanatory view illustrating exemplary conversion rules stored in an application definition storage part.

FIG. 8 is an explanatory view illustrating exemplary conversion rules stored in an application definition storage part.

FIG. 9 is an explanatory view illustrating exemplary conversion rules stored in an application definition storage part.

FIG. 10 is an explanatory view illustrating an exemplary HTTP request generated by a notified data conversion part.

FIG. 11 is an explanatory view illustrating another exemplary HTTP request generated by the notified data conversion part.

FIG. 15 is an explanatory view illustrating exemplary sensor event data to be notified from the RFID reading part to the sensor event control part.

FIG. 19 is an explanatory view illustrating an exemplary processing request (HTTP request) transmitted from the linkage registration screen as shown in FIG. 17 to the linkage registration part.

FIG. 20 is an explanatory view illustrating exemplary data registered in the linkage registration part.

FIG. 21 is an explanatory view illustrating exemplary data registered in a collected data storage part according to Embodiment 2.

DETAILED DESCRIPTION OF THE INVENTION

Figure 1:
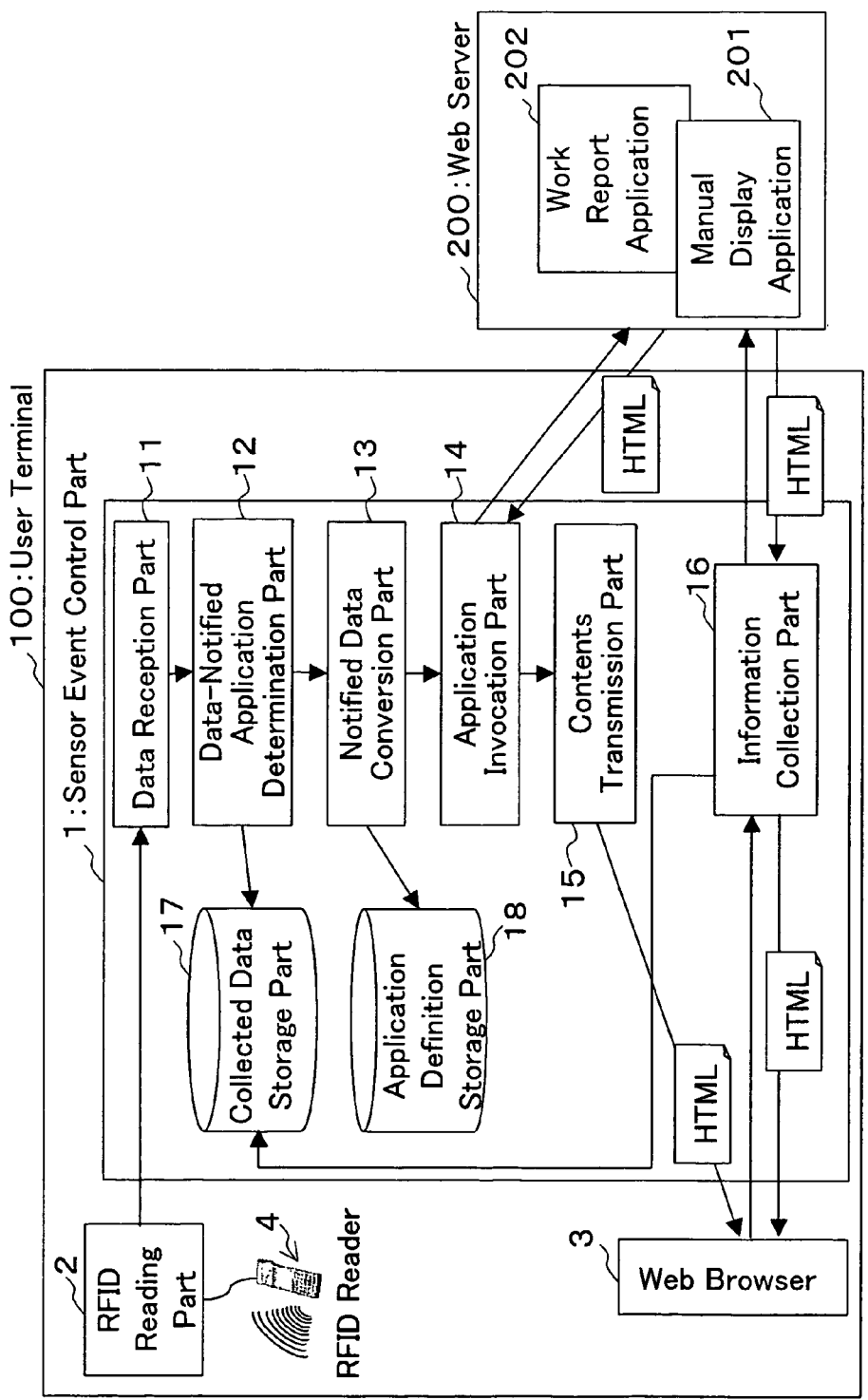
FIG. 1 is a block diagram illustrating a configuration of a sensor event control part according to Embodiment 1 of the present invention, as well as an overall configuration of a system incorporating the same.

A sensor event controller according to the present invention is a sensor event controller for notifying sensor event data obtained from a sensor device to a service application program designed for accepting a processing request containing an input from a browser and returning a result of a requested processing operation to the browser. The sensor event controller includes: an information collection part that collects information for identification of a service application program that is being used on a browser, and header information transmitted/received between the browser and the service application program, and stores the same as collected data in a collected data storage part; a data reception part that receives sensor event data obtained from the sensor device; a data-notified application determination part that, referring to the collected data in the collected data storage part, decides that the service application program that is being used on the browser is a service application program as a destination to which the sensor event data are to be notified; a data conversion part that converts the sensor event data received by the data reception part under conversion rules preliminarily defined with respect to the service application program as the notification destination, so that the data are compliant with an input interface of the service application program as the notification destination; an application invocation part that transmits a processing request to the service application program as the notification destination, the processing request being generated by adding the header information contained in the collected data in the collected data storage part to the converted sensor event data; and a contents transmission part that transmits a result of a requested processing operation received from the service application program to the browser.

This makes it possible to dynamically determine a service application program to which sensor event data are to be notified, making it unnecessary that information of a service application program to which sensor event data are to be notified is registered preliminarily on the sensor device side. Therefore, this makes it possible to use sensor event data on various service application programs. This also makes it possible to use sensor event data on service application programs that are designed on the precondition of entry by users via browsers (e.g. manual entry using keyboards), without revising interfaces for these service application programs.

In the sensor event controller according to the present invention, it is preferable that a sensor identifier for identification of a sensor device is added to sensor event data, the information collection part collects information for identification of a service application program that is being used on a browser, and header information transmitted/received between the browser and the service application program, and stores the same as collected data in the collected data storage part, in a state of being associated with a browser identifier for identification of the browser, and the sensor event controller further includes: a linkage registration part that, in order to provide linkage between a browser and a sensor device that a user uses, registers a browser identifier of the browser and a sensor identifier of the sensor device in a linkage table, in a state of being linked with each other; and a linkage determination part that, when the data reception part receives sensor event data, extracts a browser identifier linked with a sensor identifier added to the received sensor event data, by referring to the linkage table. The data-notified application determination part, referring to the collected data associated with the browser identifier in the collected data storage part, decides that a service application program that is being used on a browser corresponding to the browser identifier is a service application program as a destination to which the sensor event data are to be notified, and the application invocation part transmits a processing request to the service application program as the notification destination, the processing request being generated by adding the header information contained in the collected data associated with the browser identifier in the collected data storage part to the sensor event data converted by the data conversion part.

This configuration makes it possible to provide unique linkage between browsers and sensor devices that a user uses, in cases such that a browser and a sensor device are provided at different terminals, respectively, that a plurality of browsers and a plurality of sensor devices are provided, and the like. With this configuration, sensor event data are notified appropriately to a service application program that a user is using on a browser.

In the sensor event controller of the present invention according to the above-described preferred configuration, it is more preferable that the linkage registration part causes a browser to display a screen that allows a user to input a sensor identifier of a sensor device that the user wishes to link with the browser, and upon input of a sensor identifier, registers the input sensor identifier and a browser identifier of the browser in the linkage table, in a state of being linked with each other. This is because the foregoing configuration allows a user him/herself to select and enter a sensor identifier of a sensor device that the user wishes to link with a browser. Alternatively, the configuration may be such that the linkage registration part uses a user identifier input via a browser as a browser identifier of the browser. Still further, it is preferable that the linkage registration part registers, in the linkage table, a user identifier obtained by causing a sensor device to read a medium in which the user identifier is recorded, and a sensor identifier of the sensor device that carried out the reading of the user identifier, in a state in which the user identifier and the sensor identifier are linked with each other. This makes it possible to link a user identifier and a sensor identifier easily.

Preferably, the sensor event controller according to the present invention further includes a linkage determination part that extracts as a sensor identifier an IP address contained in sensor event data, and decides that an IP address identical to the extracted sensor identifier is a browser identifier corresponding to the sensor identifier. In the sensor event controller, the information collection part collects information for identification of a service application program that is being used on a browser, and header information transmitted/received between the browser and the service application program, and stores the same as collected data in the collected data storage part, in a state of being associated with a browser identifier of the browser, the data-notified application determination part, referring to the collected data associated with the browser identifier in the collected data storage part, decides that a service application program that is being used on a browser corresponding to the browser identifier is a service application program as a destination to which the sensor event data are to be notified, and the application invocation part transmits a processing request to the service application program as the notification destination, the processing request being generated by adding the header information contained in the collected data associated with the browser identifier in the collected data storage part to the sensor event data converted by the data conversion part. In other words, in the case where, for example, a sensor device and a browser are present on the same terminal, an IP address of the terminal can be used as a sensor identifier and a browser identifier.

In the sensor event controller according to the present invention, the foregoing sensor device is, for example, a RFID reader.

The following describes more specific exemplary embodiments of the present invention in detail, while referring to the drawings.

Embodiment 1

FIG. 1 is a block diagram illustrating a configuration of a sensor event control part according to Embodiment 1 of the present invention, as well as an overall configuration of a system incorporating the same. The system according to the present embodiment is, for example, a work support system used in repair shops, and is used for reading model information or the like recorded in a RFID tag attached to a machine to be repaired, displaying a repair manual for the model, making a work report, etc. The present invention, however, is not limited to a work support system but is applicable to any system.

As shown in FIG. 1, the present system includes a user terminal 100 and a Web server 200. It should be noted that in FIG. 1, for simplification of illustration, only one user terminal 100 and one Web server 200 are shown, but the respective numbers of such user terminals and Web servers configuring the system may be set arbitrarily. Besides, in addition to the user terminal and the Web server, any server such as a DNS server and the like may be present on the system.

The user terminal 100 is composed of, for example, a personal computer, and principally includes a sensor event control part 1, a RFID reading part 2, a Web browser 3, and a RFID reader 4. All of the sensor event control part 1, the RFID reading part 2, and the Web browser 3 are functional blocks that are implemented by processing of various kinds of data by the CPU of the user terminal 100 according to programs stored in storage parts (memory, hard disk, or other storage media) of the user terminal 100.

The sensor event control part 1 more specifically includes, as its functional blocks, a data reception part 11, a part 12 for determining an application to which data are to be notified (hereinafter referred to as "data-notified application determination part 12"), a notified data conversion part 13, an application invocation part 14, a contents transmission part 15, and an information collection part 16. These parts also are implemented by execution of predetermined programs by the CPU of the user terminal 100. Further, the sensor event control part 1 utilizes parts of the storage part of the user terminal 100 to function as a collected data storage part 15 and an application definition storage part 18.

The RFID reading part 2, implemented by the CPU of the user terminal 100 operating according to a RFID reading program, controls the RFID reader 4 so as to read contents of a RFID tag, and notifies a readout to the sensor event control part 1.

The Web browser 3 functions as an input/output interface for a user in the user terminal 100. In other words, the Web browser 3 displays a screen for entry of various operation instructions and data on a display (not shown) of the user terminal 100, and displays the contents transmitted from the Web server 200 on the screen.

The Web server 200 executes service application programs. The "service application program" generally refers to a so-called Web application program that generates some contents when receiving a HTTP request and returns the generated contents as a HTTP response. It should be noted that FIG. 1 shows, as exemplary service application programs, a manual display application 201 for displaying a repair manual on a browser, and a work report application 202 for reporting a result of a repair work, though not limiting the kinds and the number of service application programs to these of the above-described examples.

Figure 2:
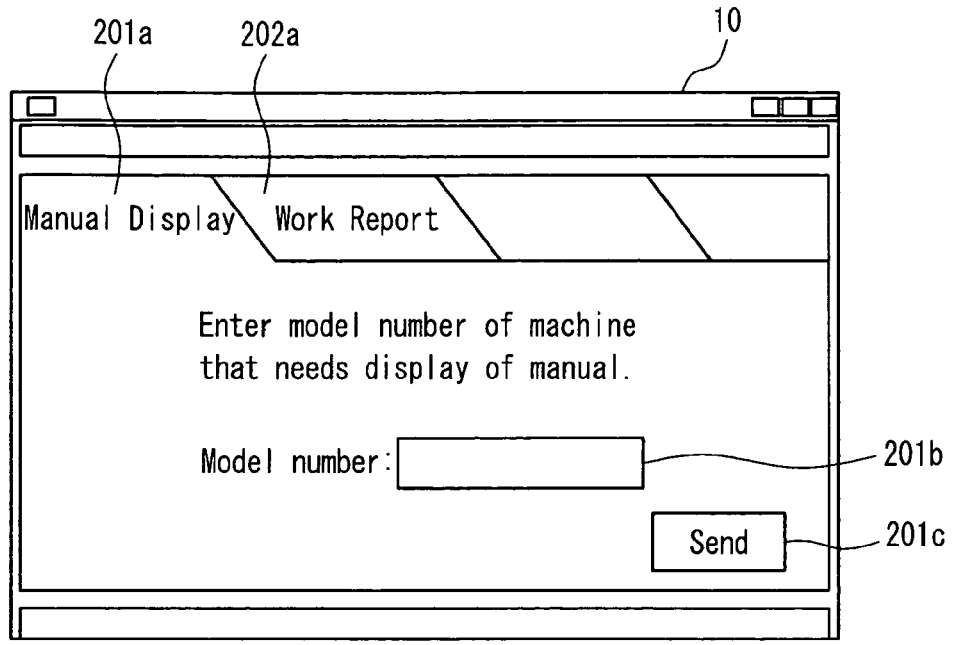
FIG. 2 is an explanatory view illustrating an exemplary display of a Web browser of a user terminal.

Here, FIG. 2 illustrates an exemplary display of the Web browser 3 of the user terminal 100. As shown in FIG. 2, the Web browser 3 displays a plurality of windows of service application programs accessible to the user terminal 100 in a switchable state on the display 10 of the user terminal 100. It should be noted that FIG. 2 is merely an example of the display of the Web browser 3, and needless to say, the screen design, the arrangement of windows, etc. are arbitrarily determined.

In the example of FIG. 2, a window 201a of the manual display application 201 is displayed in the foreground. More specifically, in the example shown in FIG. 2, the window 201a of the manual display application 201 is an active window, and the user is using the manual display application 201a on the Web browser 3. In this state, the user is allowed to switch the service application program that the user uses, from the manual display application 201 to the work report application 202, as shown in FIG. 3, by clicking a tab of a window 202a for the work report application 202, or the like.

Figure 3:
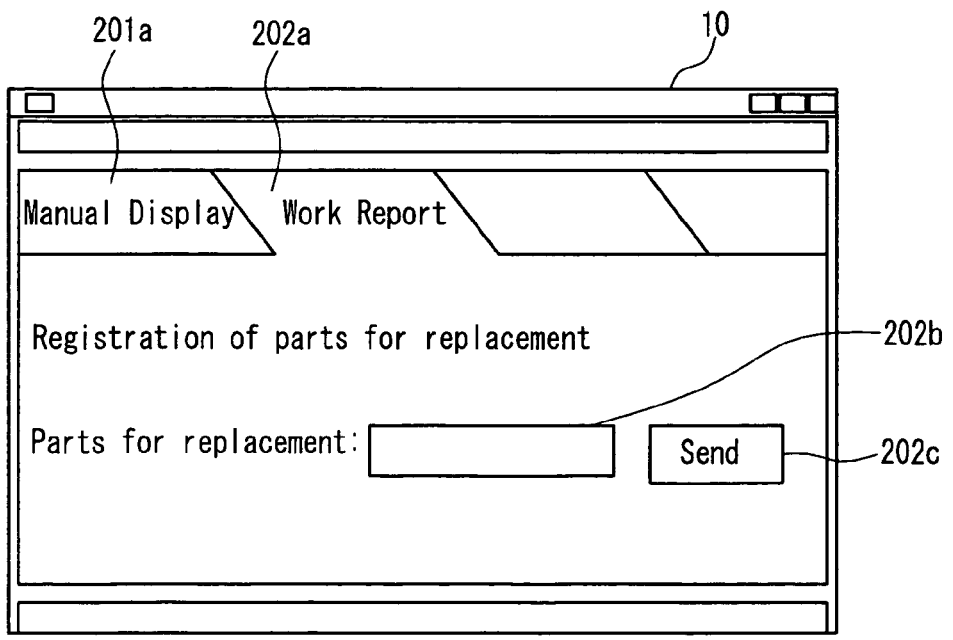
FIG. 3 is an explanatory view illustrating an exemplary display of the Web browser when, in the state of FIG. 2, a service application program in use is switched from a manual display application to a work report application.

Further, sometimes a window of a service application program is provided with a dialog box for allowing a user to enter data, like dialog boxes 201b and 202b shown in FIGS. 2 and 3, respectively. In the present system, a user is allowed to enter necessary data in these dialog boxes by using a keyboard or the like, or alternatively, data in a RFID tag of a device to be repaired are input automatically in these dialog boxes by causing the RFID reader 4 to read data out of the RFID tag.

More specifically, as will be described later in more detail, when a user him/herself enters data in a dialog box and clicks a transmission button (201c and 202c shown in FIGS. 2 and 3, respectively), the Web browser 3 transmits a processing request according to the foregoing entry to the Web server 200 and receives a result of the processing operation. On the other hand, in the case where a user uses the RFID reader 4 to have data read out of a RFID tag of a device to be repaired, the sensor event control part 1 appropriately determines to which service application program the data read out of the RFID tag are to be notified, produces a processing request according to the foregoing data, and transmits the same to the service application program that is decided to be a notification destination.

The following describes respective functions of the sections of the sensor event control part 1 for implementing the above-described process in more detail.

In the sensor event control part 1 shown in FIG. 1, the information collection part 16 collects a name of a service application program that the user is using on the Web browser 3, and header information of various HTTPs that the Web browser 3 transmits to the service application program, and stores the same as collected data in a collected data storage part 17. Examples of the header information include session IDs for retaining a session between the service application program and the Web browser 3, browser class of the Web browser 3 (User-Agent header), Cookie information that the Web application has registered in the browser (Cookie header), attributes of contents acceptable by the browser (Accept header, Accept-Language header, Accept-Encoding), and the like. It should be noted that the service application program "in use" on the Web browser 3 refers to a service application program that is executed on an active window on the Web browser 3 of the user terminal 100. In other words, even if the Web browser 3 is a multiwindow-compliant browser, only one service application program can be determined to be the program "in use" at some point in time.

An exemplary method by which the information collection part 16 acquires a name of a service application program that a user is using is as follows: respective names of service application programs and URLs of the same are registered in a storage part inside the information collection part 16 or a storage part which is accessible to the information collection part 16 (both not shown) in advance, and whether or not any of the registered URLs are included in URLs that the Web browser 3 requests is detected.

FIG. 4 shows exemplary collected data that are collected by the information collection part 16 and stored in the collected data storage part 17 when the Web browser 3 is carrying out the display shown in FIG. 2 on the display 10 of the user terminal 100. FIG. 5 shows exemplary collected data that are collected by the information collection part 16 and stored in the collected data storage part 17 when the user has switched windows on the Web browser 3 thereby causing the display 10 of the user terminal 100 to become in a state shown in FIG. 3. It should be noted that FIGS. 4 and 5 show field names and values in tabular form so that contents of the collected data are demonstrated plainly, which are different from an actual collected data format.

As shown in FIG. 4, the information collection part 16 collects the name of the service application program that the user is using on the Web browser 3 and HTTP header information that the Web browser 3 transmits. Further, as shown in FIG. 5, when the service application program that the use is using is switched to the work report application 202 on the Web browser 3, the name of the service application program that the user is using is updated on the collected data storage part 17 by the information collection part 16. Still further, as shown in FIG. 5, the header information of the work report application 202 is additionally stored in the collected data storage part 17. It should be noted that though FIG. 5 shows an example in which the session ID is changed when the user switches the service application programs, the session ID is not changed in some cases depending on the type of the Web browser 3 or the Web Server 200.

It should be noted that the "names" of the service application programs are not necessarily names that have meanings for humans (like, for example, "manual display application" and "work report application" as shown in FIGS. 4 and 5, etc.), but may be identifiers (service application ID) specifically given to the respective service application programs, or the like.

The RFID reading part 2, as described above, controls the RFID reader 4 to read data out of a RFID tag attached to a device to be repaired, and notifies sensor event data generated out of the read data to the data reception part 11 of the sensor event control part 1. The sensor event data to be notified are described in XML, for example.

FIG. 6 shows exemplary sensor event data generated by the RFID reading part 2. The sensor event data shown in FIG. 6 are described in XML, and include a timestamp indicative of date and time when the sensor event occurred (timestamp), a data type indicative of being data read out of a RFID tag (type="rfid"), and an ID number read out of the RFID tag (tagid) as a data element. The RFID reading part 2 generates such sensor event data by inserting therein the ID number read out of the RFID tag by the RFID reader 4 as a data element.

The data reception part 11 receives the sensor event data notified from the RFID reading part 2, and requests the data-notified application determination part 12 to carry out a processing operation. The data-notified application determination part 12 determines to which service application program the sensor event data transmitted from the data reception part 11 are to be notified, according to the collected data in the collected data storage part 17. In other words, as described above, the collected data include the name of the service application program that the user is using on the Web browser 3. The data-notified application determination part 12, referring to the name, decides that the service application program that the user is using on the Web browser 3 is a service application program to which the sensor event data are to be notified. Then, in the case where the user is using the manual display application 201 on the Web browser 3, the sensor event data are notified to the manual display application 201. In the case where the user is using the work report application 202, the sensor event data are notified to the work report application 202. At the same time, the data-notified application determination part 12 acquires header information relating to the service application program determined to be a destination to which the sensor event data are to be notified, from the collected data in the collected data storage part 17.

The notified data conversion part 13 converts the sensor event data under conversion rules registered in the application definition storage part 18 preliminarily, so that the data are compliant with an input interface of the service application program as the notification destination. The conversion rules include, for each service application program, definitions regarding whether sensor event data are to be transferred by the HTTP GET method or the HTTP POST method, regarding a URL of an invocation target, etc., as well as an actual conversion format for the sensor event data, and the like.

The convention of the sensor event data is implemented by, for example, preparing XSL (Extensible Style sheet Language) as a conversion format and converting the data by using XSLT (XSL Transformations). The XSLT can be acquired from Recommendation of W3C (http://www.w3.org/TR/xslt).

FIGS. 7 to 9 show exemplary conversion rules stored in the application definition storage part 18. In the example shown in FIG. 7, regarding each of the manual display application 201 and the work report application 202, which are usable in the present system, the name of the service application program (service name), the URL of the invocation target (target url), the command (command), the XSL file name of the conversion format for the sensor event data (transfer xsl), and the like are defined as conversion rules.

FIG. 8 shows exemplary contents of the XSL file defined as the conversion format for the sensor event data for the manual display application 201 (mannualservice.xsl) in FIG. 7. FIG. 9 shows exemplary contents of the XSL file defined as the conversion format for the sensor event data for the work report application 202 (report.xsl) in FIG. 7.

When the sensor event data shown in FIG. 6 are received, in the case where the service application program that the user is using is the manual display application 201, the notified data conversion part 13 applies the conversion rules shown in FIGS. 7 and 8 to the sensor event data thus received, thereby generating a HTTP request as shown in FIG. 10. More specifically, since the HTTP request to the manual display application 201 is defined under the conversion rules shown in FIG. 7 so as to be transferred by the "GET" method, the "GET" command is added at the beginning of the HTTP request. Besides, in FIG. 8, by applying the data of "tagid" in the sensor event data shown in FIG. 6 to the conversion format described as "name=<xsl: value-of select="tagid"/>, the parameter of "name=1248902" is decided as shown in FIG. 10. Further, the notified data conversion part 13, referring to the collected data storage part 17, acquires the header information (see FIG. 4) of the manual display application 201 as the service application program in use. Thus, as shown in FIG. 10, header information described as "User-Agent: Mozilla/4.0, Cookie: JSESSIONID=1234" is added to the HTTP request.

When the sensor event data shown in FIG. 6 are received, in the case where the service application program that the user is using is the work report application 202, the notified data conversion part 13 applies the conversion rules shown in FIGS. 7 and 9 to the sensor event data thus received, thereby generating a HTTP request as shown in FIG. 11. More specifically, since the HTTP request to the work report application 202 is defined under the conversion rules shown in FIG. 7 so as to be transferred by the "POST" method, the "POST" command is added at the beginning of the HTTP request. Besides, in FIG. 9, by applying the data of "tagid" in the sensor event data shown in FIG. 6 to the conversion format described as "id=<xsl: value-of select="tagid"/>, a body of "id=1248902" is generated as shown in FIG. 11. Further, the notified data conversion part 13, referring to the collected data storage part 17, acquires the header information of the work report application 202 as the service application program in use (see FIG. 5). Thus, as shown in FIG. 11, header information described as "User-Agent: Mozilla/4.0, Cookie: JSESSIONID=3567" is added to the HTTP request. Further, the names and values of headers that are wished to be added, other than the collected header information, are registered in the <add-headers> tag shown in FIG. 7, whereby the header information of "Content-Type: application/x-www-form-urlencoded" shown in FIG. 11 is added.

It should be noted that the notification data conversion part 13 may be configured so as to have not only the function of converting the notification format of the sensor event as described above but also a function of converting data in the sensor event data into business data. For example, not the ID number itself of the RFID tag is to be notified but the foregoing ID number contained in the sensor event data may be converted into character string data that have a meaning in the business. For example, the ID number of the RFID tag may be converted to a device name that has a meaning for humans. In this case, the notified data conversion part 13 has to be provided with a management table, etc., for providing linkage between the ID numbers of the RFID tags and business data in advance.

The application invocation part 14 notifies the sensor event data resulting from the conversion by the notified data conversion part 13, as a HTTP request, to the service application program of the Web server 200. Here, the application invocation part 14 adds, to the HTTP request, the HTTP header information collected by the information collection part 16 and stored in the collected data storage part 17. This allows the service application program side to treat the sensor event data notified by the application invocation part 14 in the same manner for the data notified by the Web browser 3. Further, the service application program processes the received data and returns to the application invocation part 14 the contents designed for the Web browser 3 resulting from the processing operation as a HTTP response. The application invocation part 14 receives the foregoing contents, and transmits the same to the Web browser 3 via the contents transmission part 15, to have the contents displayed.

Figure 12:
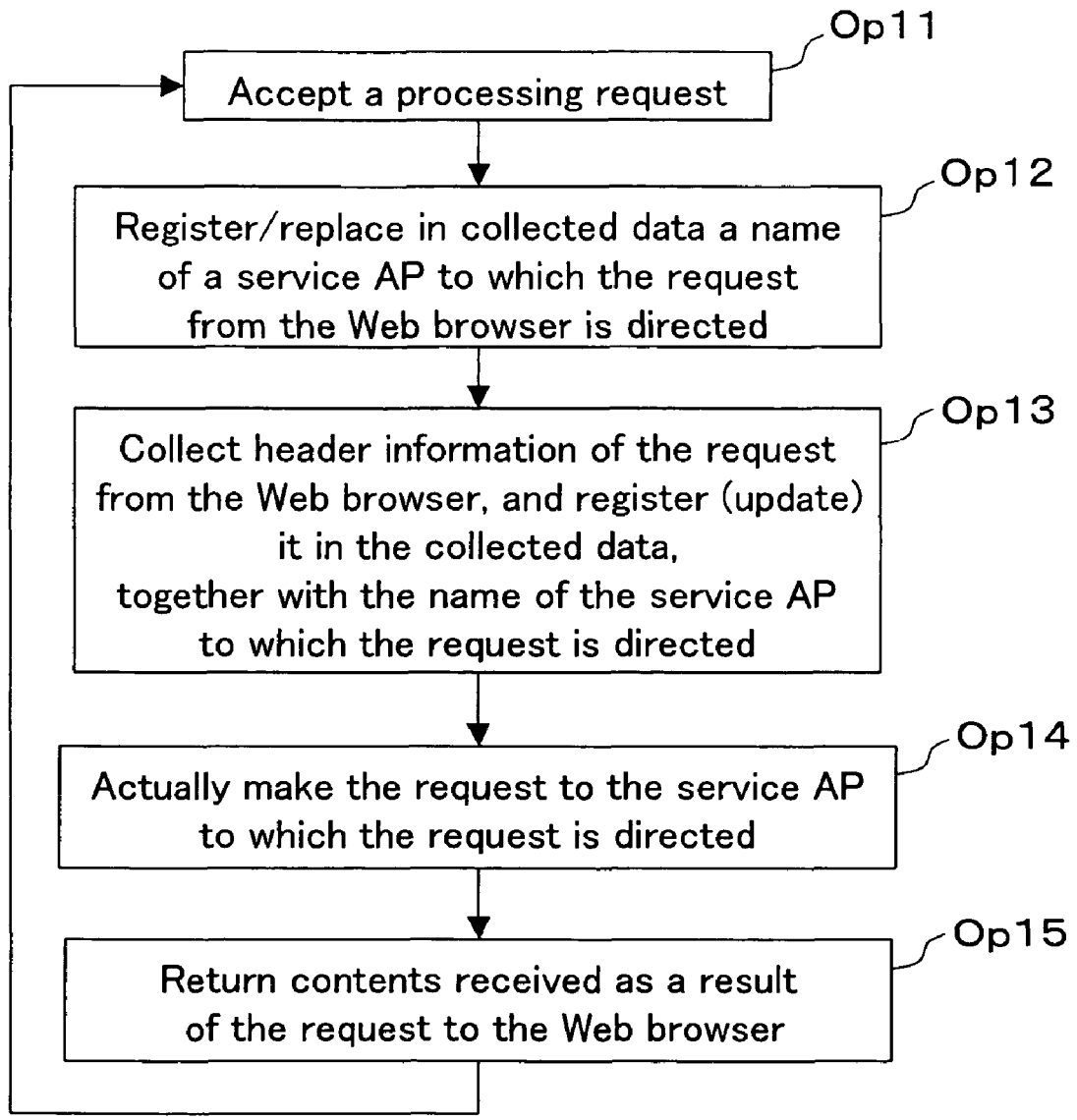
FIG. 12 is a flowchart showing an operation of a sensor event control part (information collection part) in the case where a processing request is received from the Web browser.
Figure 13:
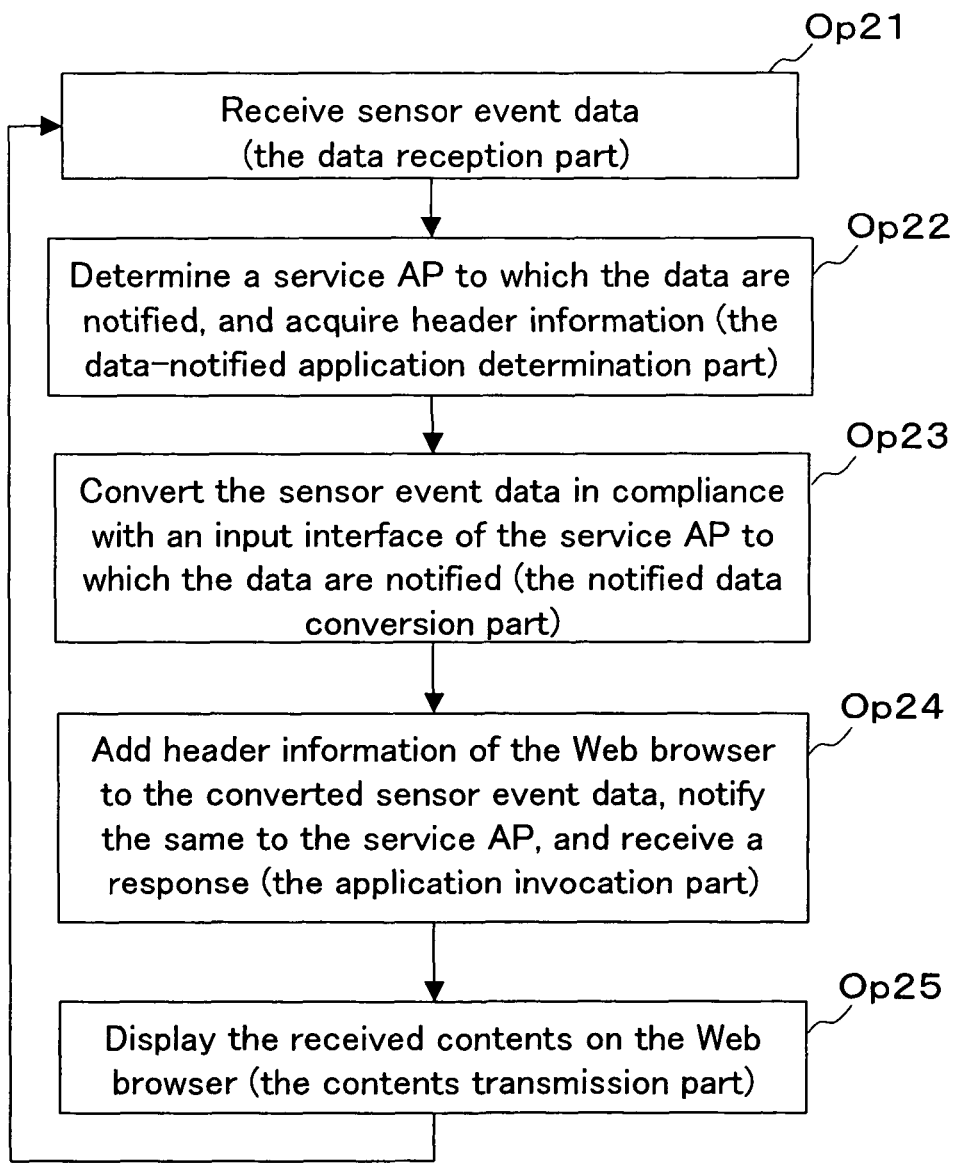
FIG. 13 is a flowchart showing an operation of the sensor event control part in the case where sensor event data are received from the RFID reading part.

Here, operations of respective parts of the sensor event control part 1 are described in more detail, with reference to flowcharts, etc. The sensor event control part 1 carries out different processing operations (1) in the case where it receives a processing request from the Web browser 3 and (2) in the case where it receives sensor event data from the RFID reading part 2. FIG. 12 is a flowchart showing an operation of the sensor event control part 1 (information collection part 16) in the case of the foregoing (1), i.e., in the case where a processing request is received from the Web browser 3. FIG. 13 is a flowchart showing an operation of the sensor event control part 1 in the case of the foregoing (2), i.e., in the case where sensor event data are received from the RFID reading part 2.

First, an operation of the sensor event control part 1 (the information collection part 16) in the case where a processing request is received from the Web browser 3 is described with reference to FIG. 12. When the information collection part 16 accepts a processing request (request) from the Web browser 3 (Operation 11), the information collection part 16 extracts the name of a service application program to which the request is directed, from the processing request from the Web browser 3, and registers the extracted name in the collected data storage part 17 (Operation 12). Further, the information collection part 16 extracts header information of the request from the Web browser 2, and registers the same in the collected data storage part 17, together with the name of the service application program to which the request is directed, which is obtained in Operation 12 (Operation 13).

Next, the information collection part 16 actually makes the request to the service application program on the Web server 200 to which the request is directed (Operation 14). Then, the information collection part 16 receives contents from the Web server 200 as a result of the requested operation, and returns the received contents to the Web browser 3 (Operation 15).

Next, an operation of the sensor event control part 1 in the case where sensor event data are received from the RFID reading part 2 is described with reference to FIG. 13. As shown in FIG. 13, when the data reception part 11 receives sensor event data from the RFID reading part 2 (Operation 21), the data-notified application determination part 12 determines a service application program to which the sensor event data are to be notified, and acquires header information (Operation 22). Next, the notified data conversion part 13 converts the sensor event data so that the sensor event data are compliant with an input interface of the service application program to which the sensor event data should be notified (Operation 23).

Next, the application invocation part 14 notifies the sensor event data converted at Operation 23 to the service application program that has been determined at Operation 22 to be a notification destination (Operation 24). Here, it should be noted that the application invocation part 14 adds the header information of the Web browser 3 to the sensor event data and notifies the sensor event data. Further, when receiving the contents for the Web browser from the service application program as a response to the foregoing notification, the application invocation part 14 transfers the received contents to the contents transmission part 15.

The contents transmission part 15 transmits the contents received from the application invocation part 14 to the Web browser 3 (Operation 25). With this, the response from the service application program is displayed on the Web browser 3.

As described above, according to the present system, when sensor event data are received from the RFID reading part 2, the sensor event control part 1 determines which service application program the user is using on the Web browser 3, and according to the sensor event data, generates a HTTP request to the service application program in use. This allows data of RFID tags to be used by various service application programs. Further, this also allows data of RFID tags to be used on service application programs that are designed on the precondition that entry is carried out by users via the Web browser 3 (manual entry using keyboards or the like), without revising interfaces for these service application programs.

It should be noted that in the foregoing description, an exemplary configuration in which the sensor event control part 1 is provided in the user terminal 100 is described. It is desirable, however, that the information collection part 16 and the sensor event control part 1 including the same are implemented as a Proxy server that relays communication between the Web browser 3 and the service application program, since the information collection part 16 is required to collect data transmitted and/or received between the Web browser 3 and the service application program.

Further, the present embodiment is described by referring to an example in which the RFID reader is used as a sensor device, but a sensor device such as a barcode reader, a QR code reading device, or the like may be used instead of the RFID reader. Still further, in place of the Web browser, another browser such as a Voice XML browser can be used.

Embodiment 2

Figure 14:
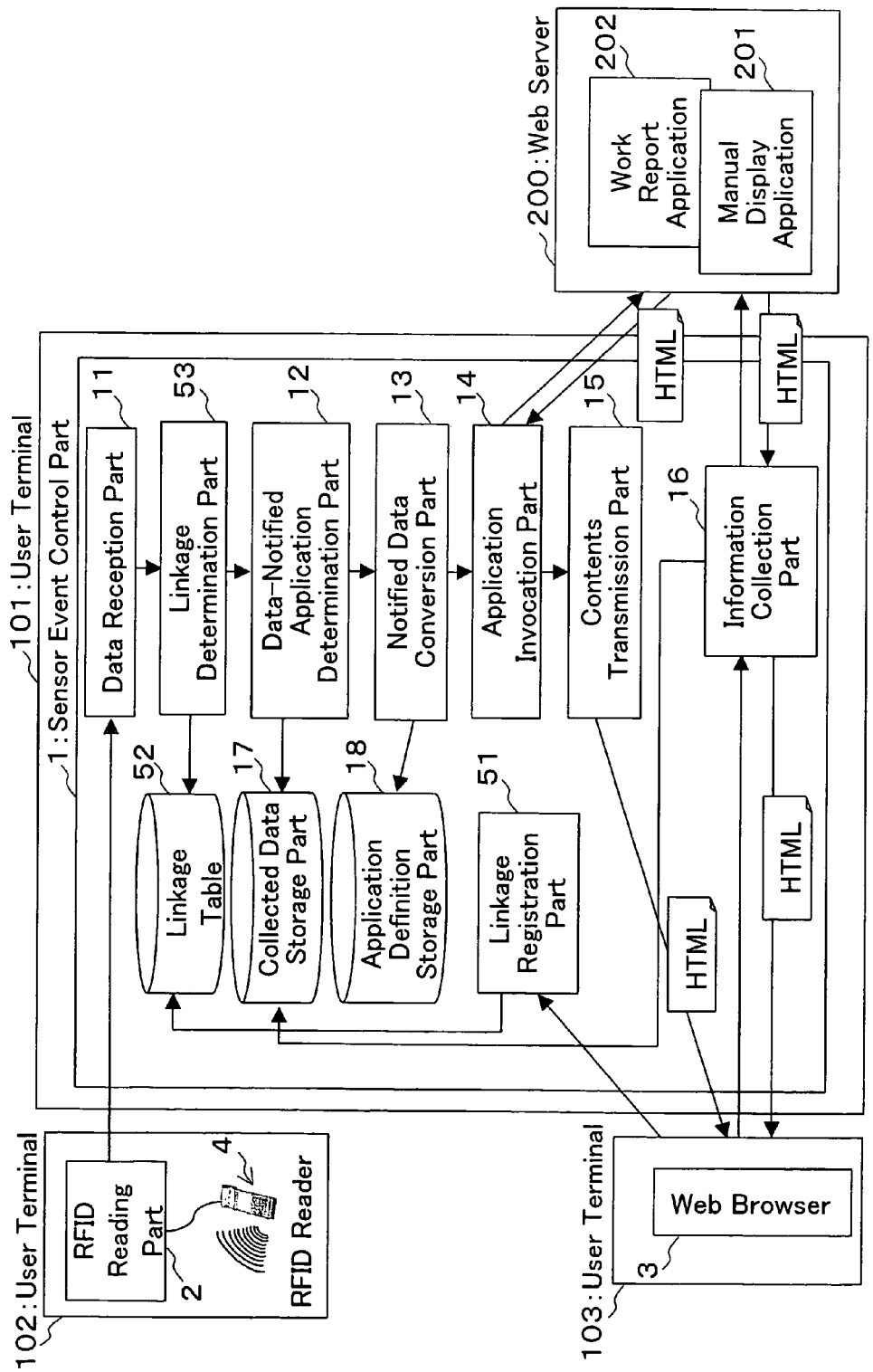
FIG. 14 is a block diagram illustrating a configuration of a sensor event control part according to Embodiment 2 of the present invention, as well as an overall configuration of a system incorporating the same.

FIG. 14 is a block diagram illustrating a configuration of a sensor event control part according to Embodiment 2 of the present invention, as well as an overall configuration of a system incorporating the same. Embodiment 1 described above is an embodiment in the case where a RFID reading part 2 (RFID reader 4), a Web browser 3, and a sensor event control part 1 are provided on one user terminal 100. The present embodiment, in turn, is an exemplary case in which a RFID reading part 2, a Web browser 3, and a sensor event control part 1 operate on different user terminals 101, 102, and 103, respectively. It should be noted that FIG. 14 shows only one user terminal 102 having the RFID reading part 2, and only one user terminal 103 having the Web browser 3, but there may be present a plurality of user terminals 102 having the RFID reading parts 2, respectively, and a plurality of user terminal 103 having the Web browsers 3, respectively.

The system according to the present embodiment includes, in addition to the configuration of Embodiment 1 shown in FIG. 1, a linkage registration part 51, a linkage table 52, and a linkage determination part 53, in order to manage the correspondence between the RFID reading part (RFID reader) and the Web browser, which are on the different user terminals, respectively, as shown in FIG. 14. Further, to identify the RFID reading part 2 (RFID reader 4) and the Web browser 3 as targets of linkage uniquely, a reader ID and a browser ID are allocated to them, respectively.

The reader ID is registered in advance in an operation control program of the RFID 4 (a program for implementing the RFID reading part 2). The RFID reading part 2 adds this reader ID to sensor event data when notifying the sensor event data to the sensor event control part 1. FIG. 15 shows exemplary sensor event data to be notified from the RFID reading part 2 to the sensor event control part 1. In this example, "Reader3425" is added as the reader ID.

On the other hand, the browser ID is given automatically to the Web browser 3 by the information collection part 16 when the Web browser 3 makes the first access to the information collection part 16, and is stored in the Web browser 3. The Web browser 3 adds the browser ID to every HTTP request issued thereafter when transmitting the HTTP request, thereby allowing the information collection part 16 of the sensor event control part 1 to identify the browser ID. In order to thus cause the Web browser 3 to store a browser ID and to add the browser ID to a HTTP request when transmitting the HTTP request, the scheme involving Cookies can be used.

Figure 16:
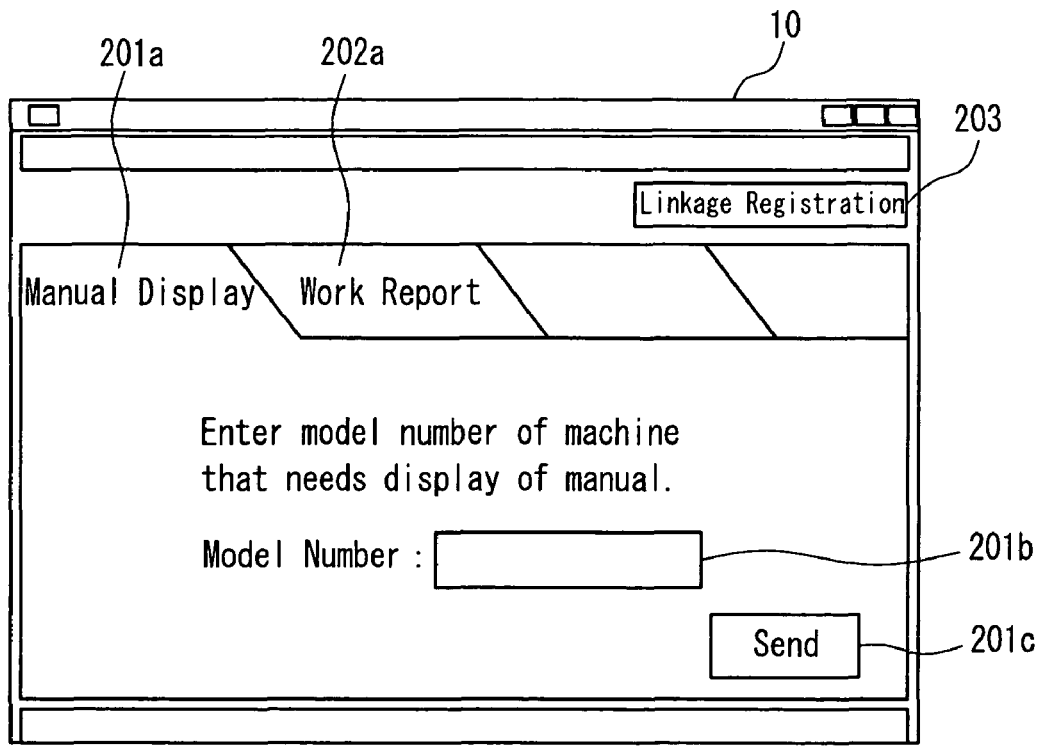
FIG. 16 is an explanatory view illustrating an exemplary page in which a button for activating a linkage registration screen is embedded.

The linkage registration part 51 generates linkage data representing correspondence between browser IDs and reader IDs, and registers the same on the linkage table 52. In the present embodiment, a user registers a reader ID on a linkage registration screen displayed on the Web browser 3, whereby linkage between the browser ID and the reader ID is established. As a method for providing the user with means for activating the linkage registration screen, for example, a button 203 for activating the linkage registration screen may be embedded in contents returned from a service application program, as shown in FIG. 16 for example, by the information collection part 16. Alternatively, a page in which a button for activating the linkage registration screen is embedded by the information collection part 16 upon the first access by the Web browser 3 and a page for a service application program may be displayed by dividing a frame.

Figure 17:
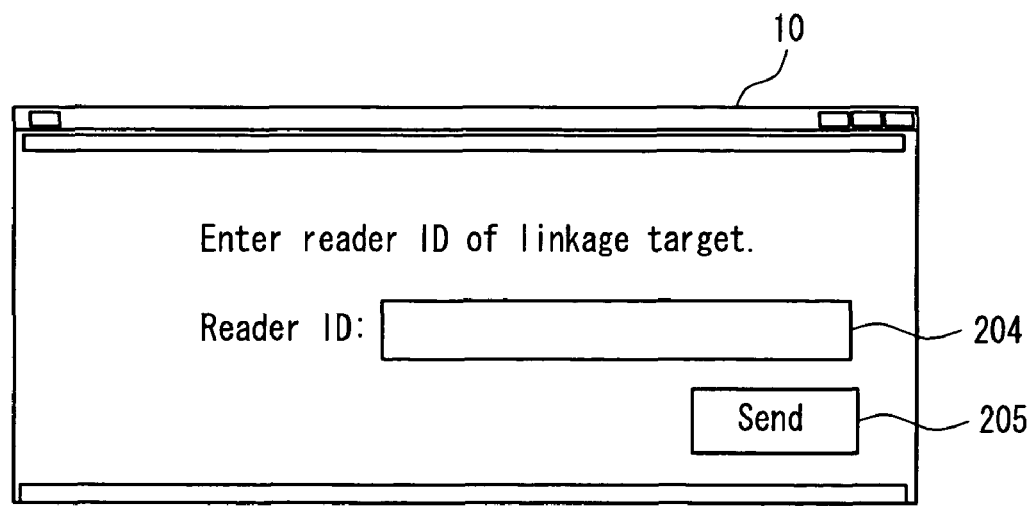
FIG. 17 is an explanatory view illustrating an exemplary linkage registration screen.

In an example shown in FIG. 16, for instance, when a user clicks the button 203 displayed on the screen, a request for acquiring the linkage registration screen is sent from the Web browser 3 to the linkage registration part 51, and in response to the foregoing request, the linkage registration screen as shown in FIG. 17 is displayed. When the user enters a desired reader ID in a reader ID entry dialog box 204 on the linkage registration screen and clicks a transmission button 205, a linkage registration request is transmitted from the Web browser 3 to the linkage registration part 51. Receiving this request, the linkage registration part 51 registers the browser ID of the Web browser 3 that the user is using at the point in time and the reader ID input in the dialog box 204 in the linkage table 52, in a state in which the browser ID and the reader ID being associated with each other. It should be noted that the example shown in FIG. 17 is configured so that the user enters the reader ID directly in the dialog box 204, but alternatively, a list of reader IDs that can be registered may be displayed by using a drop-down list, etc., from which the user selects a desired reader ID.

Figure 18:
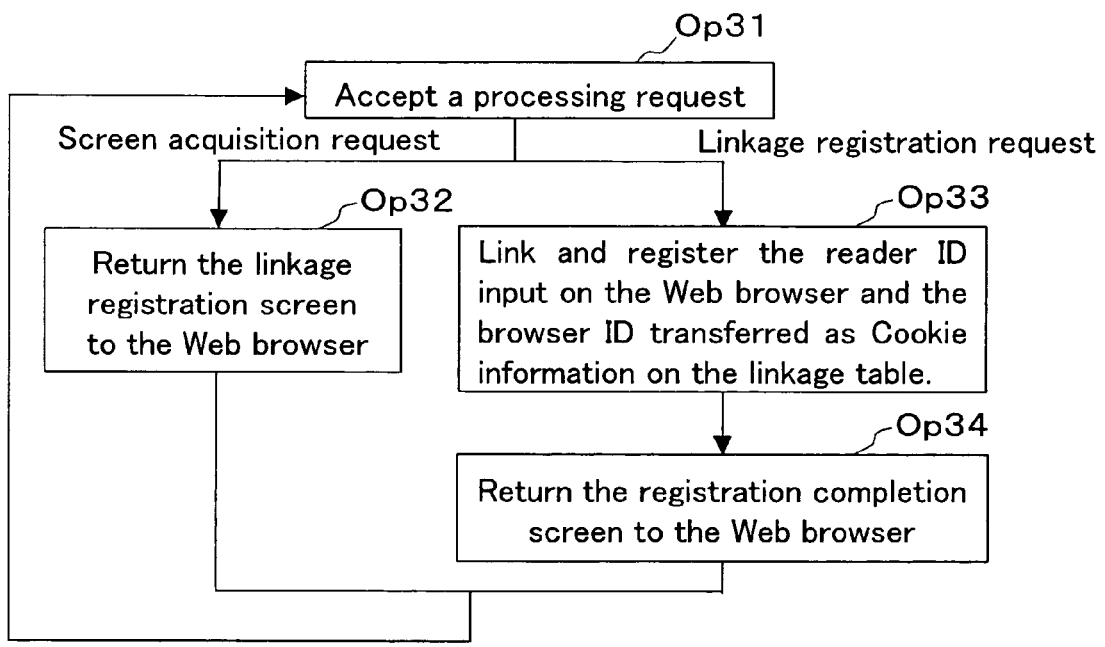
FIG. 18 is a flowchart showing an operation of the linkage registration part.

Here, an operation of the linkage registration part 51 for implementing the above-described processing operation is described with reference to a flowchart shown in FIG. 18. When accepting a processing request from the Web browser 3 (Operation 31), in the case where the processing request is a request for acquisition of the linkage registration screen, the linkage registration part 51 returns a HTTP response for display of the linkage registration screen to the Web browser 3 (Operation 32). On the other hand, in the case where the processing request from the Web browser 3 is a linkage registration request, the linkage registration part 51 provides linkage between the reader ID input on the Web browser 3 and the browser ID transferred as Cookie information each other, and registers the same on the linkage table 52 (Operation 33). After the registration is completed, the linkage registration part 51 returns a HTTP response for display of a registration completion screen to the Web browser 3 (Operation 34).

FIG. 19 shows an exemplary processing request (HTTP request) transmitted from the linkage registration screen as shown in FIG. 17 to the linkage registration part 51. In this request, "Web001" in "Cookie: WEBID=Web001" is the browser ID transferred as Cookie information to the Web browser 3. "Reader3425" in "readerid=Reader3425" is the reader ID input in the dialog box 204. Thus, the browser ID and the reader ID are associated with each other, and are registered in the linkage registration part 51, as shown in FIG. 20, for example.

The information collection part 16 of the present embodiment identifies a browser ID every time the information collection part 16 receives a HTTP request from the Web browser 3, and manages collected data for each of the browser IDs in the collected data storage 17, as shown in FIG. 21. In other words, as shown in FIG. 21, in the collected data storage part 17 of the present embodiment, for each of the browser IDs, the name and header information of the service application program used on the Web browser 3 having the foregoing browser ID are managed. With this configuration, the sensor event control part 1 is allowed to identify, regarding each Web browser 3, which service application program is used on the Web browser 3.

Figure 22:
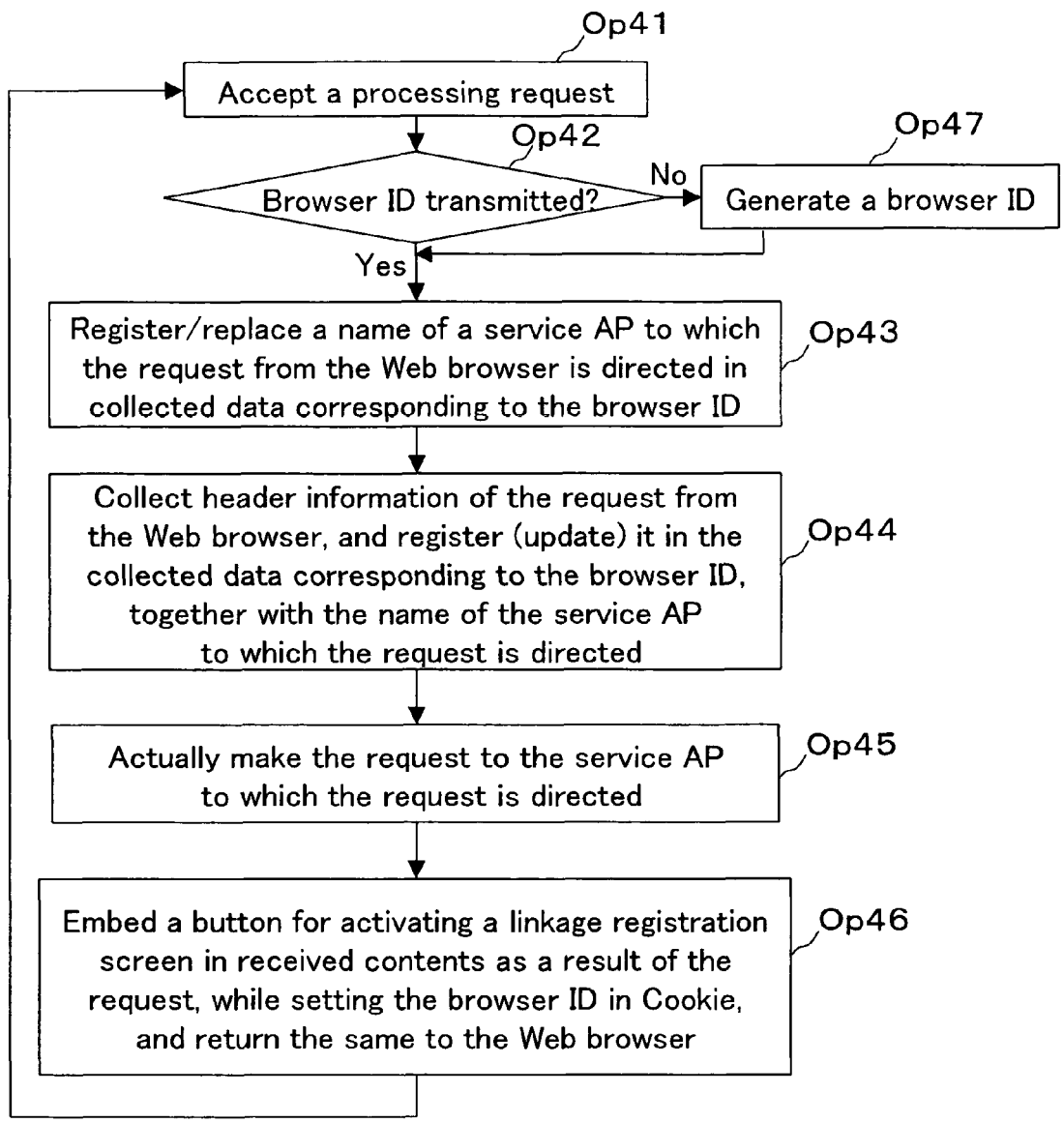
FIG. 22 is a flowchart showing an operation of an information collection part according to Embodiment 2.

Here, an operation of the information collection part 16 in the present embodiment is described with reference to a flowchart of FIG. 22. As shown in FIG. 22, when accepting a processing request (HTTP request) from a Web browser 3 (Operation 41), the information collection part 16 determines whether or not a browser ID is contained in the HTTP request (Operation 42). In the case where no browser ID is contained, the information collection part 16 generates a browser ID anew, and uses the generated browser ID as a browser ID transmitted from the Web browser 3 in carrying out subsequent operations (Operation 47). On the other hand, in the case where a browser ID contained in the HTTP request is identified, the information collection part 16 stores, in the collected data storage part 17, the name of the service application program to which the processing request from the Web browser 3 is transmitted as collected data corresponding to the browser ID identified in Operation 42 (Operation 43). At the same time, the information collection part 16 collects header information of the HTTP request from the Web browser 3, and stores the foregoing header information as collected data corresponding to the browser ID identified in Operation 42 in the collected data storage part 17, together with the name of the service application program to which the request is directed (Operation 44).

Next, the information collection part 16 actually makes the request to the service application program to which the request is directed (Operation 45). Then, receiving contents from the service application program as a result of the requested operation, the information collection part 16 embeds a button for activating a linkage registration screen in the foregoing received contents while setting the browser ID in Cookie, and returns the same to the Web browser 3 (Operation 46).

Through the above-described process, the information collection part 16 of the present embodiment is allowed to collect the name and header information of a service application program in use for every browser ID, and manage the same as collected data.

Figure 23:
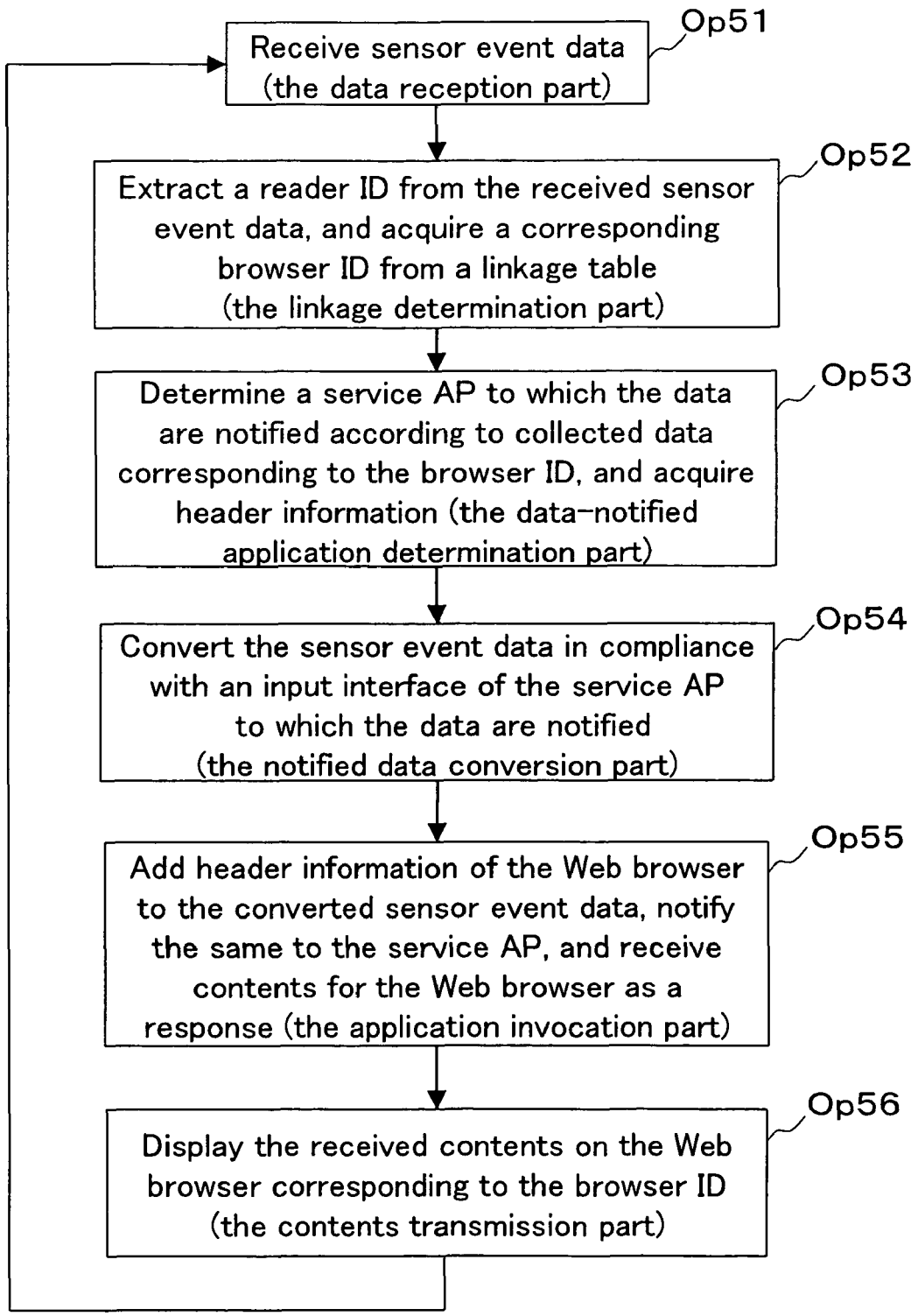
FIG. 23 is a flowchart showing an operation in the case where a sensor event control part according to Embodiment 2 receives sensor event data from a RFID reading part.

Next, a processing operation in the case where the sensor event control part 1 of the present embodiment receives sensor event data from the RFID reading part 2 is described with reference to a flowchart shown in FIG. 23.

When the data reception part 11 receives the sensor event data from the RFID reading part 2 (Operation 51), the linkage determination part 53 extracts a reader ID from the sensor event data thus received, and acquires a browser ID corresponding to the foregoing reader ID from the linkage table 52 (Operation 52). Next, referring to the collected data in the collected data storage part 17 that correspond to the browser ID thus acquired at Operation 52, the data-notified application determination part 12 determines a service application program to which the sensor event data are to be notified and acquires header information (Operation 53). Next, the notified data conversion part 13 converts the sensor event data so that the data are compliant with an input interface of the service application program to which the sensor event data are to be notified (Operation 54).

Next, the application invocation part 14 notifies the sensor event data that have been converted at Operation 54 to the service application program that has been determined to be a destination of notification at Operation 53 (Operation 55). Here, the application invocation part 14 adds, to the sensor event data, the header information of the Web browser 3 contained in the collected data corresponding to the browser ID that has been acquired at Operation 52, and notifies the sensor event data. Further, when receiving contents for the Web browser from the service application program as a response to the foregoing notification, the application invocation part 14 transfers the received contents to the contents transmission part 15.

The contents transmission part 15 transmits the contents received from the application invocation part 14 at Operation 55 to the Web browser 3 corresponding to the browser ID acquired at Operation 52 (Operation 56). With this, the response from the service application program is displayed on the Web browser 3.

Accordingly, even in the case where a plurality of the RFID reading parts 2 and the RFID readers 4, and a plurality of Web browsers 3 are provided, the above-described processing operation makes it possible that, when a user has data read out of a RFID tag of a device to be repaired by using the RFID reader 4, the sensor event control part 1 appropriately determines which service application program is a destination to which the data thus read out of the RFID tag should be notified, generates a processing request based on the foregoing data, and transmits the request to the service application program determined to be a destination of notification.

It should be noted that as a method of the present embodiment for linking a Web browser 3 and sensor event data with each other, a method in which a user carries out the registration of linkage between a browser ID and a reader ID is described, but other various linking methods are applicable.

For example, though in the present embodiment a browser ID is generated for each Web browser 3, the information collection part 16 may carry out the user authentication at the first access from the Web browser 3, so that a user ID used therein may be used in place of a browser ID. Alternatively, a RFID in which a user ID is registered (user tag) may be read into a RFID reader to which the user ID is to be linked, so that the linkage registration part 51 associates the user ID read out of the user tag with the reader ID of the RFID reader that has carried out the reading operation, and registers the same in the linkage table 52. As the user tag, for example, an IC card that the user uses for his/her identification such as a company staffer ID card, etc. may be used. The data reception part 11 of the sensor event control part 1 determines which the received sensor event data are, either a RFID tag of a device to be repaired or a user tag in which the user ID is registered. In the case where the received sensor event data are a user tag, the linkage registration part 51 is invoked, and is caused to carry out a linkage registration operation. The determination of the received sensor event data to be either a user tag or a RFID tag of a device to be repaired may be carried out by, for example, configuring a RFID tag so that data functioning as a flag indicating whether the data are a user tag or not are registered therein, and making the foregoing determination by checking whether or not such data are present in a RFID tag. Alternatively, the determination may be carried out based on the range of an ID number of a tag.

Further, in the case where, for example, the RFID reading part 2 and the Web browser 3 are provided in the same user terminal while only the sensor event control part 1 operates on another terminal, another linkage method may be used, which is as follows. In such case, the RFID reading part 2 and the Web browser 3 have the same IP address. Therefore, the IP address of the user terminal may be used as the reader ID and the browser ID. To begin with, the IP address of a transmitter of a HTTP request always is added as IP packet data and notified. Therefore, it is unnecessary to explicitly add the IP address on the side of the Web browser 3 or the RFID reading part 2. In the foregoing case, upon receiving a request from the Web browser 3, the information collection part 16 uses the IP address of the Web browser 3 as a browser ID, and generates and manages collected data for each browser ID (IP address). The data reception part 11 extracts the transmitter's IP address upon receiving sensor event data, and the linkage determination part 53 acquires collected data of the Web browser 3 corresponding to the foregoing IP address. In this way, the linkage determination is carried out. Therefore, in this method, the linkage table 52 and the linkage registration part 51 are unnecessary.

As described above, according to the present invention, a user dynamically determines a service application program in use and notifies sensor event data to the foregoing service application program. This makes it possible to use sensor event data on various service application programs. Further, sensor event data are converted so as to be compliant with an input interface of a service application program and are notified to the program. This makes it possible to use an already-existing interface of the service application program without any change.

Though Embodiments 1 and 2 are described by referring to an example in which the sensor event control part 1 is implemented by a user terminal (computer), it should be noted that a program for allowing the function of the sensor event control part 1 to be implemented by a computer, and a recording medium in which the foregoing program is recorded, also fall in the scope of embodiments of the present invention.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A sensor event controller for notifying sensor event data obtained from a sensor device to a service application program designed for accepting a processing request containing an input from a browser and returning a result of a requested processing operation to the browser, the sensor event controller comprising:
    an information collection part that collects information for identification of a service application program that is being used on a browser, and header information transmitted/received between the browser and the service application program, and stores the same as collected data in a collected data storage part;
    a data reception part that receives sensor event data obtained from the sensor device;
    a data-notified application determination part that, referring to the collected data in the collected data storage part, decides that the service application program that is being used on the browser is a service application program as a destination to which the sensor event data are to be notified;
    a data conversion part that converts the sensor event data received by the data reception part under conversion rules preliminarily defined with respect to the service application program as the notification destination, so that the data are compliant with an input interface of the service application program as the notification destination;
    an application invocation part that transmits a processing request to the service application program as the notification destination, the processing request being generated by adding the header information contained in the collected data in the collected data storage part to the converted sensor event data; and
    a contents transmission part that transmits a result of a requested processing operation received from the service application program to the browser.

2. The sensor event controller according to claim 1, wherein
    a sensor identifier for identification of a sensor device is added to sensor event data, and
    the information collection part collects information for identification of a service application program that is being used on a browser, and header information transmitted/received between the browser and the service application program, and stores the same as collected data in the collected data storage part, in a state of being associated with a browser identifier for identification of the browser,
    the sensor event controller further comprising:
    a linkage registration part that, in order to provide linkage between a browser and a sensor device that a user uses, registers a browser identifier of the browser and a sensor identifier of the sensor device in a linkage table, in a state of being linked with each other; and
    a linkage determination part that, when the data reception part receives sensor event data, extracts a browser identifier linked with a sensor identifier added to the received sensor event data, by referring to the linkage table,
    wherein the data-notified application determination part, referring to the collected data associated with the browser identifier in the collected data storage part, decides that a service application program that is being used on a browser corresponding to the browser identifier is a service application program as a destination to which the sensor event data are to be notified, and
    the application invocation part transmits a processing request to the service application program as the notification destination, the processing request being generated by adding the header information contained in the collected data associated with the browser identifier in the collected data storage part to the sensor event data converted by the data conversion part.

3. The sensor event controller according to claim 2, wherein the linkage registration part causes a browser to display a screen that allows a user to input a sensor identifier of a sensor device that the user wishes to link with the browser, and upon input of a sensor identifier, registers the input sensor identifier and a browser identifier of the browser in the linkage table, in a state of being linked with each other.

4. The sensor event controller according to claim 2, wherein the linkage registration part uses a user identifier input via a browser as a browser identifier of the browser.

5. The sensor event controller according to claim 4, wherein the linkage registration part registers, in the linkage table, a user identifier obtained by causing a sensor device to read a medium in which the user identifier is recorded, and a sensor identifier of the sensor device that carried out the reading of the user identifier, in a state in which the user identifier and the sensor identifier are linked with each other.

6. The sensor event controller according to claim 1, further comprising:
    a linkage determination part that extracts as a sensor identifier an IP address contained in sensor event data, and decides that an IP address identical to the extracted sensor identifier is a browser identifier corresponding to the sensor identifier,
    wherein the information collection part collects information for identification of a service application program that is being used on a browser, and header information transmitted/received between the browser and the service application program, and stores the same as collected data in the collected data storage part, in a state of being associated with a browser identifier of the browser,
    the data-notified application determination part, referring to the collected data associated with the browser identifier in the collected data storage part, decides that a service application program that is being used on a browser corresponding to the browser identifier is a service application program as a destination to which the sensor event data are to be notified, and
    the application invocation part transmits a processing request to the service application program as the notification destination, the processing request being generated by adding the header information contained in the collected data associated with the browser identifier in the collected data storage part to the sensor event data converted by the data conversion part.

7. The sensor event controller according to claim 1, wherein the sensor device is a RFID reader.

8. A program product storing a sensor event control program in a non-transitory recording medium, the sensor event control program being designed to cause a computer to execute a processing operation of notifying sensor event data obtained from a sensor device to a service application program designed for accepting a processing request containing an input from a browser and returning a result of a requested processing operation to the browser, the program comprising instructions for allowing a computer to execute the following operations of:

collecting information for identification of a service application program that is being used on the browser, and header information transmitted/received between the browser and the service application program, and stores the same as collected data in a collected data storage part;

receiving the sensor event data obtained from the sensor device;

referring to the collected data in the collected data storage part, and deciding that the service application program that is being used on the browser is a service application program as a destination to which the sensor event data are to be notified;

converting the sensor event data under conversion rules preliminarily defined with respect to the service application program as the notification destination, so that the data are compliant with an input interface of the service application program as the notification destination;

transmitting a processing request to the service application program as the notification destination, the processing request being generated by adding the header information contained in the collected data in the collected data storage part to the converted sensor event data; and transmitting a result of a requested processing operation received from the service application program to the browser.

\* \* \* \* \*